United States Patent [19]
Priesemuth

[11] Patent Number: 5,543,666
[45] Date of Patent: Aug. 6, 1996

[54] METHOD OF REDUCING THE PEAK LOAD OF ENERGY SUPPLY NETWORK SYSTEMS AND APPARATUS FOR LIMITING THE POWER CONSUMPTION OF A CONSUMER UNIT FED FROM AN ENERGY SUPPLY CONNECTION

[76] Inventor: Wolfgang Priesemuth, Postkamp 13, 25524 Breitenburg-Nordoe, Germany

[21] Appl. No.: 319,827

[22] Filed: Oct. 7, 1994

[30] Foreign Application Priority Data

Oct. 9, 1993 [DE] Germany .......................... 43 34 488.7

[51] Int. Cl.⁶ ........................................................ H02J 3/14
[52] U.S. Cl. .................................. 307/39; 307/31; 307/32; 307/33; 307/38
[58] Field of Search .................................... 307/39, 31, 32, 307/33, 38

[56] References Cited

U.S. PATENT DOCUMENTS

| | | | |
|---|---|---|---|
| 4,283,635 | 8/1981 | Balmer | 307/31 |
| 4,349,879 | 9/1982 | Peddie et al. | 364/492 |

Primary Examiner—William M. Shoop, Jr.
Assistant Examiner—Albert W. Paladini
Attorney, Agent, or Firm—Robert W. Becker & Associates

[57] ABSTRACT

A method of reducing the peak load of energy supply network systems to which a number of consumer units, each of which has several consumers, are connected. The power consumption of the consumer units can be limited to a predetermined limiting value. At least some of the consumers of a consumer unit are operated one by one in a sequence controlled by a preselectable coordination program if the power consumption of consumers that are switched on has reached the predetermined limiting value. An apparatus for limiting the power consumption of a consumer unit that includes several consumers and is fed from an energy supply connection, comprises a coordination means that is connected to separating switches which are linked to at least some of the consumers and controls the separating switches via a program in such a way that the power consumption of the energy supply connection does not surpass a predetermined limiting value. If the predetermined limiting value of the power consumption is exceeded or not reached, the means causes the separating switches to open or close in a fixed sequence that is defined by a preselectable coordination program with which the coordination means is programmed.

10 Claims, 3 Drawing Sheets

METHOD OF REDUCING THE PEAK LOAD OF ENERGY SUPPLY NETWORK SYSTEMS AND APPARATUS FOR LIMITING THE POWER CONSUMPTION OF A CONSUMER UNIT FED FROM AN ENERGY SUPPLY CONNECTION

BACKGROUND OF THE INVENTION

The present invention relates to a method of reducing the peak load of energy supply network systems to which a number of consumer units, each of which has several consumers, are connected, whereby the power consumption of the consumer units can be limited to a predetermined limiting value. The present invention also relates to an apparatus for limiting the power consumption of a consumer unit that includes several consumers and is fed from an energy supply connection.

Energy supply network systems, to which a number of consumer units, each having several consumers, are connected, have to be structured regarding their capacities in such a way that they can easily meet the peak demand of the consumer units if many of the consumers are switched on simultaneously. The consumer units can be business enterprises, public network systems, households etc., with each having several consumers, e.g. electrical machines, heating devices, lighting devices etc. The total energy consumption of the consumer units fluctuates under statistical factors, whereby, however considerable power loads are the case if, e.g. on cold days, when many heating devices are in operation, additionally cooking devices are in operation after a television show, warm water is used for showers etc.

DE 34 26 542 A1 discloses a method or a means for the load limitation in energy supply network systems, whereby a means is connected in series to the energy consumption counters linked to each household, which means contains an audiofrequency-ripple control receiver, a load control unit and a power switch. The means is controlled by a central unit in such a way that in case the complete network system load approaches the critical point of the electric supply enterprise, the load limiter is activated by the audiofrequency-ripple control receiver. This allows every single household the consumption of a defined maximum power only. Hence, the household is urged to determine the power input of its consumers in such a way that the maximum power as a limiting value is not surpassed. If this does not occur, the household will get switched off completely by the central unit. Although the described means can limit the peak load of electric network systems, in reality such means did not gain acceptance since households, as experiences has shown, do not reduce their electric consumption if requested to do so. A complete switch off of a household is totally unacceptable for customers and it can lead to dangerous or at least cost-effective side effects.

It is therefore an object of the present invention to provide a method of the aforementioned general type whereby the peak load of the energy supply network systems can be efficiently reduced in a manner that is acceptable for the customers, especially individual households.

SUMMARY OF THE INVENTION

If the power consumption of switched-on consumers has reached the predetermined limiting value, the method of the present invention provides for operating at least some of the consumers of a given one of the consumer units one by one in a sequence determined by a preselectable coordination program.

According to the inventive method, which is applicable for electric energy supply network systems, gas supply network systems, or water supply network systems and similar supply network systems, the total power input per consumer unit, e.g. a household, a business enterprise etc., is limited to a predetermined limiting value. The consumers of each consumer unit are operated in such a way that if the predetermined limiting value is exceeded or surpassed, such a number of consumers gets switched off by a preselectable coordination program that the predetermined limiting value will not be reached. As soon as the consumers that are in operation get switched off, the switched off consumers will be connected automatically via a preselectable coordination program. The coordination program will be preselected in such a way that, e.g. in case of its usage in households, as little reduction of the comfort level as possible is the consequence. This is achieved in that the consumers whose operation can be interrupted or delayed easily, get lower priority.

With the inventive method, with which in principle all consumer units that are connected to an energy supply network system can operate, a considerable reduction of the peak load of the energy supply network system is possible. This is due to the fact that every consumer unit is designed to act self-responsibly in that they themselves take care that not too many consumers of the consumer unit are operating simultaneously. Thus, existing capacities for the generation of energy can be used more efficiently and less resource capacity for a) the generation of energy and b) the design of the network system is necessary. This leads on the one hand to cost reduction and on the other hand to more efficiency regarding the generation of energy, the latter again leading to cost reduction.

By making the limiting value of the maximum power consumption and/or the coordination program variable, for example via the control of a chronometer, a high flexibility of the inventive method can be achieved, since the respective maximum power consumption can be varied, for example as a function of the time of day or of the season in conformity with the statistical switch-on ratings, without reaching impermissible high peak loads of the energy supply network system. The changeability of the coordination program is expedient, since thereby various demands of the consumer units can be taken into account.

A further object of the present invention is an apparatus for limiting the power consumption of a consumer unit that is fed from an energy supply connection; such an apparatus can be used in particular for realizing the inventive method.

DE-Z: etz. (1988) H.5 pages 210 to 214: Paessler: "Cost reduction of energy via energy control and ripple control technology" discloses a device that makes it possible to reduce the cost of energy through energy control, in that the peak loads, which will be charged according to the design of the tariffs, will be reduced. For this purpose, the energy controller unit controls the consumers that can be controlled according to a predetermined strategy in such a way that the drop of the finally charged peak loads is the consequence. According to a predetermined and defined control strategy, the energy consumers will be connected to the energy supply network system in such a way that the consumption of power from the energy supply network system always remains below a predetermined limiting value. The described device is not suitable for usage in households, since in households neither the duration nor the sequence of entry of the single consumers are predetermined. The named publication does not deal with the problem of the object of the invention as a whole, that is to dropping the peak load of electric energy supply network systems.

The apparatus of the present invention comprises: separating switches that are linked to at least some of the consumers, and a coordination means that is connected to at least some of the separating switches and controls the same in conformity with a program such that power consumption from the energy supply connection does not exceed a predetermined limiting value; in particular, when the predetermined limiting value is exceeded, the coordination means opens separating switches in a sequence determined by a preselectable coordination program with which the coordination means is programmed, and when the predetermined limiting value is not reached, the coordination means closes separating switches in a sequence determined by the coordination program.

The coordination means, designed according to the invention, will cut off the connection of the consumer to the energy supply system in a preselectable sequence if the predetermined limiting value is surpassed. If the power consumption remains below the predetermined limiting value the consumer will get connected to the energy supply network system in a preselectable sequence. The optimum selection of the coordination program leads to reduction of the power consumption and finally to as slight an impairment of the consumer unit as possible. For example, it is possible to deal with wishes of persons belonging to a consumer unit in an automatic and flexible way, since, e.g. with each cut off of a consumer, it is proved automatically if one or even more consumers that just got cut off via a separating switch can be reconnected to the energy supply system. This means that their operation is minimally delayed or interrupted.

Where a drop in the power consumption of a consumer unit triggers closing of a separating switch, every reduction of the power consumption of the consumer unit leads to an attempt to connect a further consumer to the energy supply system. Such a reduction of the power consumption can be caused e.g. by a program controlled consumer, e.g. a washing machine, finishing a heating period and starting a washing period, whereby power capacity is released, which can be used for other consumers.

If after a reduction of the power consumption the coordination means closes a further separating switch if the closing of a first separating switch leads to a surpassing of the limiting value and hence to the reopening of that separating switch, the coordination means always tries to connect as many consumers as possible under the precondition that the predetermined limiting value is not surpassed. This means that the defined limiting value of the power consumption gets used to a maximum extent.

A means can be provided to recognize the closing of manually operatable operating switches of individual consumers, with these operating switches being connected in series to the separating switches and the sequence of the closing of the operating switches determining the sequence of closing of the corresponding separating switches. The objective of this is that the coordination program of the coordination means automatically adapts to the wishes of the operating personnel, it being presumed that the sequence of the closing of the operating switches should also determine the priority of the switching on of the pertaining consumers.

To adapt the characteristics of the apparatus to respective requirements in a simple manner, the coordination means contains a programmable electronic control unit for defining the coordination program and/or the limiting value.

To adapt the respective limiting value as a function of the time of day and of the season and in conformity with the statistical load of the energy supply network system, the coordination means can contain a chronometer that establishes the limiting value and/or the coordination program. Similarly, it is possible to vary the coordination program as a function of time. For example, it is possible to select different priorities for the daytime as opposed to evening or night.

A specific embodiment of the inventive apparatus that is particularly advantageous in practice is for use in the energy supply system of a consumer unit, and provides a safety unit having safety fuses, via which the individual consumers are connected to the network connection, with the individual separating switches being connected in series to the individual safety fuses.

So that the inventive apparatus can be easily retrofitted in already existing means, the separating switches, along with further associated components, are combined in a common housing of a unit that can be retrofitted.

To enable a particularly convenient programming of the coordination means, a manually operatable input means of the programmable electronic control unit is disposed at a distance from the housing that contains the separating switches.

Pursuant to another embodiment of the inventive apparatus, the consumer unit can be connected to several phases of the energy supply system, and throw-over switches that are controlled by the coordination means can be provided so that individual consumers can be selectively connected to different phases. The objective thereof is that for multi-phase circuit connections, every phase can be loaded to a predetermined limiting value, thus making it possible to achieve a maximum balanced usage of the phases.

BRIEF DESCRIPTION OF THE DRAWINGS

The present invention will now be described in detail in conjunction with the following schematic drawings, in which.

DESCRIPTION OF PREFERRED EMBODIMENTS

Figure 1:
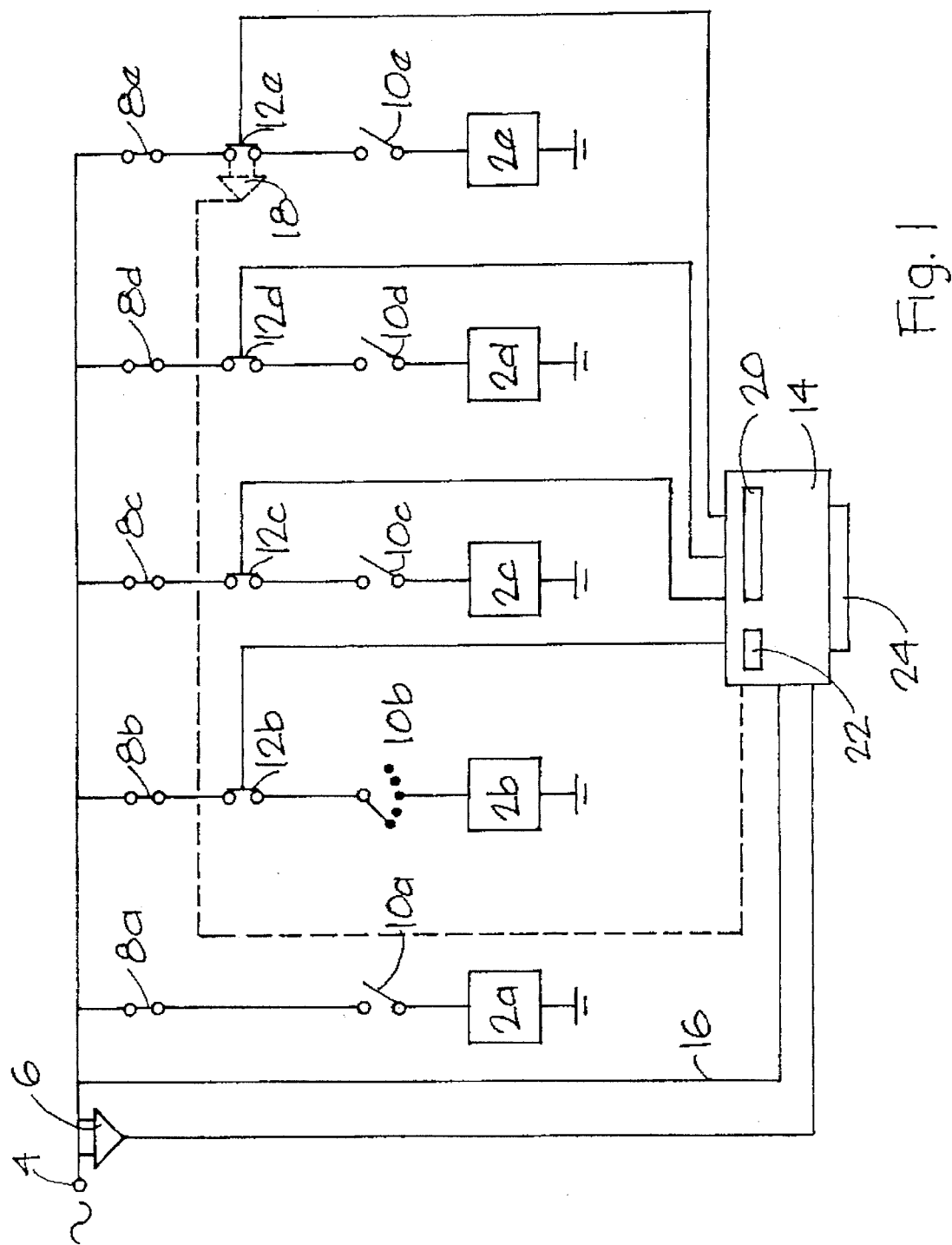
FIG. 1 is a block diagram of one exemplary embodiment of the inventive apparatus.

According to FIG. 1, the users $2a$ to $2e$, which belong to one consumer unit, e.g. a household, are connected to a supply line 4 of a public energy supply network system. The energy supply line 4 is followed by a power measurement unit 6, which generates a signal that corresponds to the present power consumption of all consumers.

The single consumers $2a$ to $2e$ are connected to the energy supply line 4 via associated safety fuses $8a$ to $8e$ and include operating switches $10a$ to $10e$, which can be operated manually.

In the illustrated embodiment, 2a indicates the lights of a household, which are protected by a common safety fuse, 2b the stove with different cooktops and an oven, which can be switched on by different operating positions of the operating switches 10b, 2c a hot water heater, 2d a dishwasher, and 2e a washing machine. Separating switches 12b to 12e are disposed between the operating switches 10b to 10e and the safety fuses 8b to 8e; the separating switches can be operated by a coordination means 14. Furthermore, the coordination means 14 is connected to the power measurement unit 6 and is provided with power via a line 16.

The coordination means includes a display 20, a chronometer 22 and an input means 24. The coordination means contains an electronic control unit that can be programmed in such a way that it determines the sequence of operation of the consumers 2a to 2e. This is for the situation where the present power input of all consumers 2a to 2e surpasses a limiting value, which can also be programmed. In this connection, the limiting value can be switched between different values as a function of the chronometer 22. It is also possible, controlled by the chronometer, to switch between different priority or coordination programs, which are programmable by the input means 24.

Advantageously, the separating switches 12b to 12e and the associated measurement units 18b to 18e are grouped in a non-illustrated box or housing that is close to a box that accommodates the safety fuses 8a to 8e. In the case of a new installation, it is possible to put the safety fuses 8 and the separating switches 12 in a common box. Advantageously, the coordination means itself is at an easily accessible site of a household.

Figure 2:
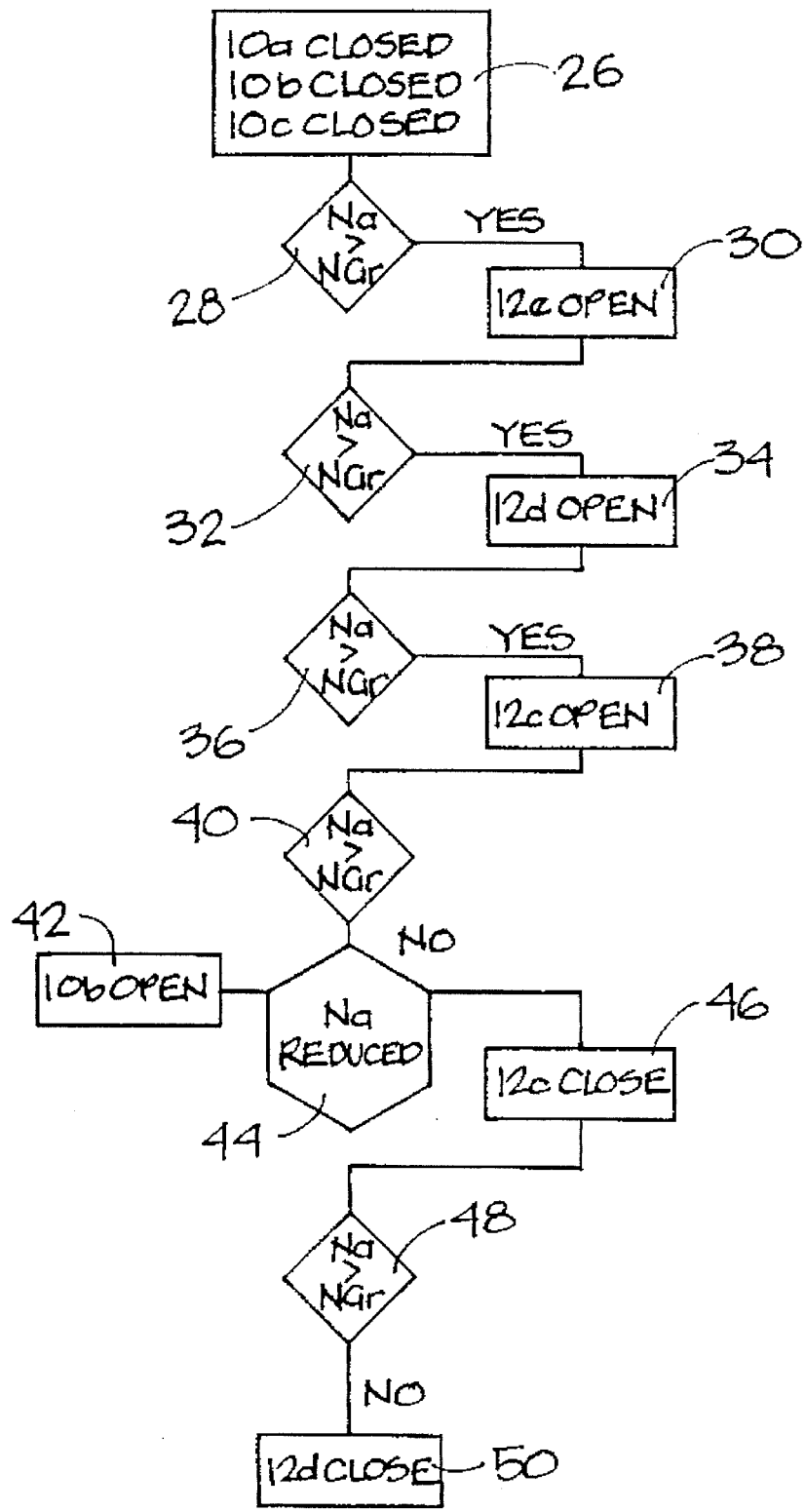
FIG. 2 is a program flow diagram for describing the function of the apparatus of FIG. 1, with $N_a$ being the total present power consumption and $N_{Gr}$ being the limiting value.

As an example, the function of the described apparatus will be explained in conjunction with FIG. 2. It will be assumed that the priority program set in the coordination means determines the sequence of the entry of the consumers as follows:

The light 2a has highest priority and is not influenced by the coordination means 14. Otherwise, the row of priorities is as follows: first stove 2b, second the hot water heater 2c, third the dishwasher 2d and last the washing machine 2e. Furthermore, it is assumed that the predeterminable limiting value of the maximum power consumption is set to such a value that will be reached if all lights 2a and all single consumers of the stove 2b are in operation.

Assume that at step 26 all of the operating switches 10a, 10b and 10c are closed, whereby the stove 2b, including all consumers, are to be switched on. At step 28 the coordination means registers that the present total power consumption $N_a$ surpasses the predetermined limiting value Consequently, at step 30 the separating switch 12e is opened in conformity with the determined sequence of priorities. Since the operating switch 10e is opened, it is registered at step 32 that $N_a$ further surpasses $N_{Gr}$. Consequently, at step 34 the separating switch 12d is opened. Since the operating switch 10d is also opened, it is registered at step 36 that $N_a$ is further beyond $N_{Gr}$. Consequently, at step 38 the separating switch 12c is opened and the hot water heater 2c is switched off. At step 40 it is registered that now $N_a$ is no longer greater than $N_{Gr}$. Consequently, the coordination means 14 does not cause any further switching.

Assume that at step 42 the stove 2b gets switched off by opening of the operating switch 10b. This means that the coordination means 14 registers the drop of the present power consumption $N_a$ at step 44. Consequently, the separating switch 12c is closed at step 46. Therefore, the hot water heater now gets switched on. At step 48 it is registered that the present power consumption $N_a$ is not further beyond the limiting value $N_{Gr}$. Consequently, the separating switch 12d is closed at step 50. A further step, which is not illustrated, is a monitoring of the power consumption, which is beyond the limiting value $N_{Gr}$ when the operating switch 10d is closed. Consequently, the separating switch 12d is opened again, etc.

The described flow of the program is just an example. Many variations and embodiments are possible. For example, it is possible to close a separating switch almost immediately after having opened it if the opening did not lead to any change of the power consumption. Consequently, as many separating switches as possible are closed, which makes advantageous programs possible. Furthermore, it is possible to link every separating switch to a measurement unit 18 (shown in dashed lines) that can register if the corresponding operating switch is opened or closed, even in the case of an opened separating switch. In this or the aforementioned way the coordination means 14 is able to register in which sequence the operating switches are closed without causing the start of the operation of the associated consumers due to the surpassing of the limiting value. With suitable software in the coordination means 14, the sequence of the closing of the operating switches can thus determine the sequence of the operating of the associated consumers, which means that it determines the closing of the pertaining separating switches.

In a further embodiment of the invention it is possible to turn on all separating switches one by one and to cause only those separating switches to remain closed where a closing would not lead to a surpassing of the limiting value. For example, this could be caused by a reduction of the total power consumption, which e.g. can be caused by switching off one cooktop only. On the other hand, this could be caused if one consumer finishes its heating phase and starts another that requires less power. In this way it is guaranteed that use will always be made of the maximum power input allowed.

For a flexible operation of the apparatus it can be of advantage if the opened push-switches get closed in certain time intervals for a short time period, to remain closed if the pertaining operating switches are opened or get reopened just after closing, if the pertaining operating switches are closed whereby then the information of the closing position of the operating switches is available.

Figure 3:
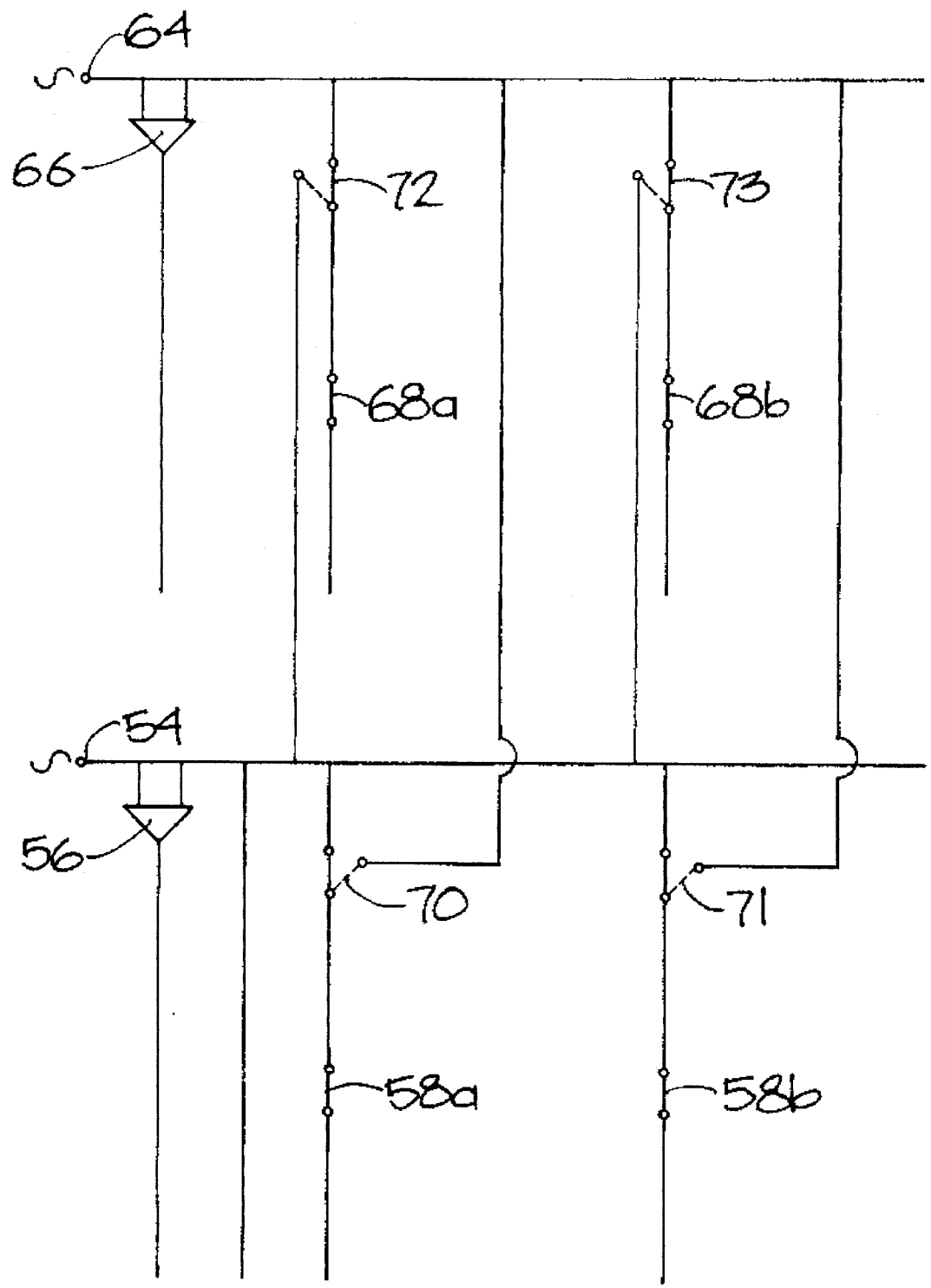
FIG. 3 is a partial view of a modified embodiment of the inventive apparatus.

FIG. 3 illustrates a further development of the design according to FIG. 1, in which the energy supply line has two phases, namely 54 and 64. Each phase supplies an arrangement according to FIG. 1 with a power measurement means 56 or 66, safety fuses 58a, 58b or 68a, 68b etc. Both means are connected to a common coordination means, which is not illustrated. Since it can occur that one phase is loaded up to the limiting value permitted, however the other phase has available resources, the individual consumers are linked to throw-over switches 70, 71, 72 and 73 via which it is possible to put the consumers into another phase, where they will be provided with energy, presuming that the limiting value permitted will not be surpassed. The throw-over switches 70 to 73 are controlled by the coordination means. In the case of polyphase circuit supply lines, it is thus possible to preset a) limiting values for the load of the single phases and b) the total power consumption of the consumer unit.

The present invention is, of course, in no way restricted to the specific disclosure of the specification and drawings, but also encompasses any modifications within the scope of the appended claims.

What I claim is:

1. A method of reducing the peak load of energy supply network systems to which a number of consumer units, each of which has several consumers, are connected, whereby the power consumption of said consumer units can be limited to a predetermined limiting value, said method including the steps of:

if the power consumption of switched-on consumers of a consumer unit exceeds said predetermined limiting value, said consumers are switched off in sequence in conformity with a preselectable coordination program until the power consumption is below said predetermined limiting value; and utilizing a decrease in the power consumption of said consumers of said consumer unit as a trigger for switching on said consumers in a sequence determined by said preselectable coordination program.

2. An apparatus for limiting the power consumption of a consumer unit that includes several consumers and is fed from an energy supply connection, said apparatus comprising:

separating switches linked to at least some of said consumers; and a coordination means that is connected to at least some of said separating switches and controls the same in conformity with a program such that power consumption from said energy supply connection does not exceed a predetermined limiting value; in particular, when said predetermined limiting value is exceeded, said coordination means opens separating switches in a sequence determined by a preselectable coordination program with which said coordination means is programmed, and when said predetermined limiting value is not reached, said coordination means closes separating switches in a sequence determined by said coordination program, closing of separating switches being triggered by a drop in power consumption of said consumers.

3. An apparatus according to claim 2, wherein after a drop in power consumption said coordination means closes a further separating switch if closing of a first separating switch leads to a surpassing of said limiting value and hence to a reopening of said first separating switch.

4. An apparatus according to claim 2, which includes manually operatable operating switches for individual ones of said consumers that are connected in series with said separating switches, and which also includes means for recognizing the closing of said operating switches, whereby a sequence of closing of said operating switches determines the sequence of closing of the pertaining separating switches.

5. An apparatus according to claim 2, wherein said coordination means contains a programmable electronic control unit for defining at least one of said coordination program and said limiting value.

6. An apparatus according to claim 2, wherein said coordination means contains a chronometer that establishes at least one of said limiting value and said coordination program.

7. An apparatus according to claim 2, which includes a safety unit having safety fuses via which individual ones of said consumers are connected to said supply connection, with individual ones of said separating switches being connected in series to individual ones of said safety fuses.

8. An apparatus according to claim 5, wherein said separating switches, along with further pertaining components, are disposed in a common housing of a unit that can be retrofitted.

9. An apparatus according to claim 8, wherein said programmable electronic control unit of said coordination means includes a manually operable input means that is disposed at a distance from said housing of said separating switches.

10. An apparatus according to claim 7, wherein said consumer unit is connected to several phases of said energy supply connection, and which includes throw-over switches that are controlled by said coordination means and via which individual ones of said consumers can be selectively connected to different ones of said phases.

* * * * *